United States Patent [19]

Smith et al.

[11] Patent Number: 4,993,059
[45] Date of Patent: Feb. 12, 1991

[54] ALARM SYSTEM UTILIZING WIRELESS COMMUNICATION PATH

[75] Inventors: James L. Smith; Gregory M. Howison, both of Dallas, Tex.

[73] Assignee: Cableguard, Inc., Dallas, Tex.

[21] Appl. No.: 308,188

[22] Filed: Feb. 8, 1989

[51] Int. Cl.$^5$ ...................... H04M 11/04; H04Q 7/00
[52] U.S. Cl. ........................................ 379/39; 379/45; 379/49; 379/51; 379/59; 455/33
[58] Field of Search .................. 379/2, 32, 33, 37–40, 379/42–44, 46–51, 59, 60, 63; 455/33, 56

[56] References Cited

U.S. PATENT DOCUMENTS

| | | | |
|---|---|---|---|
| Re. 32,856 | 2/1989 | Millsap et al. | 340/539 |
| 2,719,188 | 9/1955 | Pierce . | |
| 3,575,558 | 4/1971 | Leyburn et al. | 179/41 |
| 3,634,627 | 1/1972 | Velentini | 179/15 BA |
| 3,647,973 | 3/1972 | James et al. | 179/2 DP |
| 3,692,952 | 9/1972 | Leonard | 179/41 A |
| 3,694,579 | 9/1972 | McMurray | 179/5 R |
| 3,986,119 | 10/1976 | Hemmer, Jr. et al. | 325/3 |
| 4,023,139 | 5/1977 | Samburg | 340/147 R |
| 4,176,254 | 11/1979 | Tuttle et al. | 379/49 X |
| 4,338,493 | 7/1982 | Stenhuis et al. | 179/5 R |
| 4,347,501 | 8/1982 | Akerberg | 340/539 |
| 4,371,751 | 2/1983 | Hilligoss, Jr. et al. | 179/5 R |
| 4,415,770 | 11/1983 | Kai et al. | 179/2 |
| 4,417,100 | 11/1983 | Carlson et al. | 179/5 R |
| 4,447,872 | 5/1984 | Nothaft | 364/200 |
| 4,465,904 | 8/1984 | Gottsegen et al. | 179/5 R |
| 4,467,142 | 8/1984 | Rupp et al. | 179/5 R |
| 4,510,350 | 4/1985 | Wagner et al. | 379/38 |
| 4,577,182 | 3/1986 | Millsap et al. | 340/539 |
| 4,658,096 | 4/1987 | West, Jr. et al. | 379/59 |
| 4,686,697 | 8/1987 | Shapiro et al. | 379/38 |
| 4,718,079 | 1/1988 | Rabito | 379/2 |
| 4,718,080 | 1/1988 | Serrano et al. | 379/59 |
| 4,731,810 | 3/1988 | Watkins | 379/33 |
| 4,737,975 | 4/1988 | Shafer | 379/58 |
| 4,775,997 | 10/1988 | West, Jr. et al. | 379/58 |
| 4,788,711 | 11/1988 | Nasco, Jr. | 379/59 |
| 4,817,126 | 3/1989 | Hendershot | 379/63 X |
| 4,825,456 | 4/1989 | Rosenberg | 379/57 |

FOREIGN PATENT DOCUMENTS 295146 12/1988 European Pat. Off. .
WO89/05553 6/1989 World Int. Prop. O. ............ 379/40

OTHER PUBLICATIONS

*Security*, vol. 24, No. 5, May 1987, p. 18, "Cellular Communications Goes Off-Road to Transmit Alarms".
Stuart Crump, Jr., "AB1X Landline Emulator for Cellular", *Personal Communications Technology*, Jun. 1986, pp. 39, 42.
"Southwestern Bell Cellular Service—System Description", Copyright 1985, Southwestern Bell Mobile Systems, Inc.
"ATT Security System 8000", Owner's Reference Manual, ©1988.

*Primary Examiner*—Jin F. Ng
*Assistant Examiner*—Wing F. Chan
*Attorney, Agent, or Firm*—Ross, Howison, Clapp & Korn

[57] ABSTRACT

An alarm system for a protected premises includes an alarm sensor for generating an alarm signal in the event of an alarm condition. A cellular-type radio/telephone transceiver is located at the protected premises and includes circuitry for generating and transmitting a unique identification number of the transceiver and a send signal for wireless communication with a cellular site. Structure is provided for connecting the alarm signal line to the cellular-type radio/transceiver such that upon receipt of the alarm signal, the cellular-type radio/transceiver will transmit the unique identification number and the send signal to the cellular site with no transmission of the telephone number of an alarm monitoring station to thereby enable the cellular site to transmit the alarm condition to the alarm monitoring station.

19 Claims, 6 Drawing Sheets

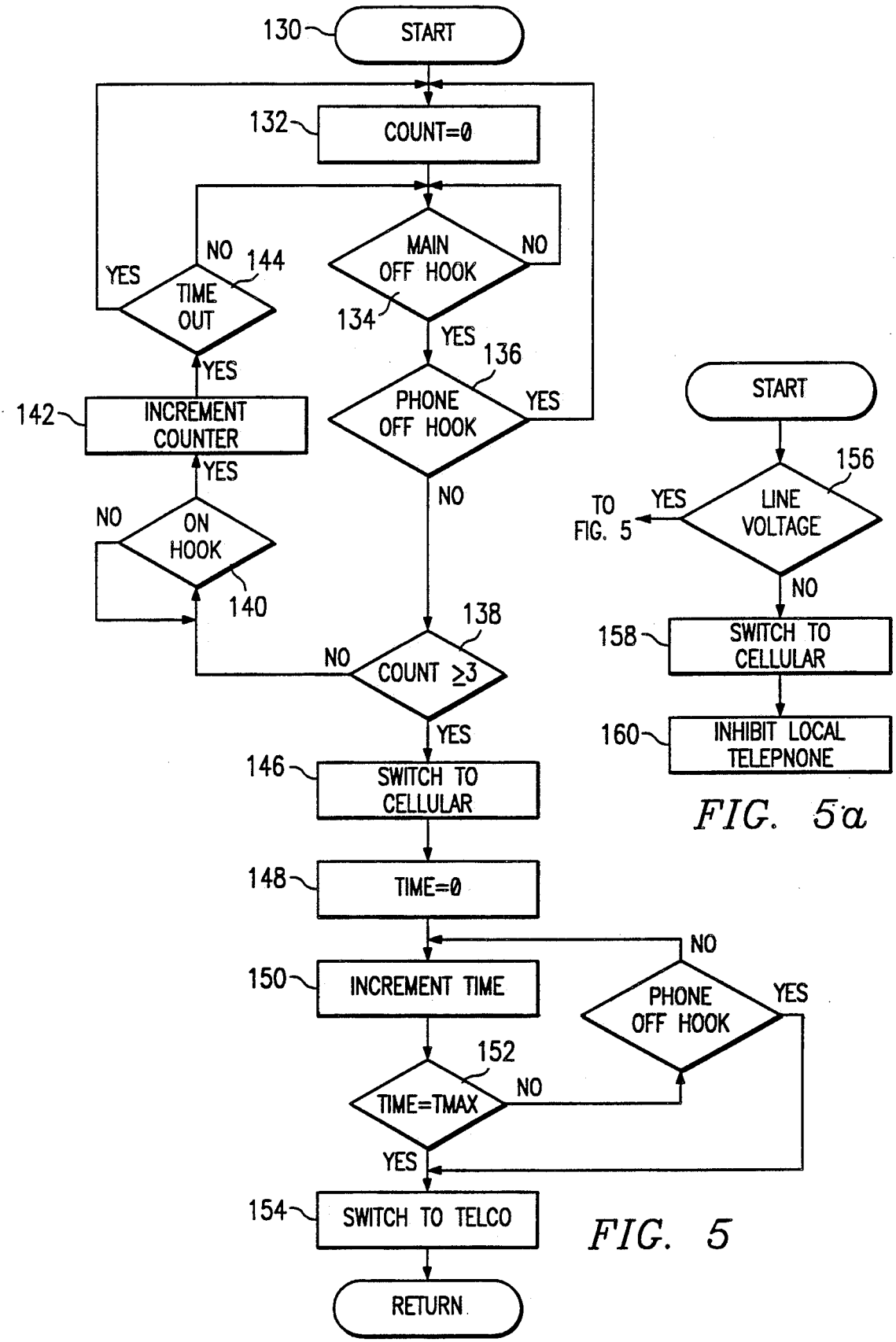

ALARM SYSTEM UTILIZING WIRELESS COMMUNICATION PATH

TECHNICAL FIELD

This invention relates to alarm systems, and more particularly to the communication link between the alarm panel and the central station over a cellular-type/telephone communication system.

BACKGROUND OF THE INVENTION

A large number of alarm systems are presently manufactured to provide protection against various problem situations which may be experienced in a residence, an office building, manufacturing facility, or any other premises. Fire, burglary, panic or other unique alarm situations can be sensed locally and the information can then be transmitted by a local communicator through appropriate connections to the local telephone lines for transmission to a receiver location at a suitable central location. In this manner, the information can in turn be relayed to the appropriate agency, such as a fire department, a police department, or other desired recipient.

In a typical alarm system, such as a burglar alarm system, the system is connected via telephone lines to an alarm monitoring station. For example, the premises typically may have a protective circuit which may comprise a number of intrusion detectors, a voltage source, a sensing relay and wiring connecting these components together The alarm system generally includes an alarm control panel where the sensing relay may be located, a key-operated switch, and a latching relay. When an alarm condition occurs, the latching relay is caused to activate an audible/or visible warning device or a signal that is transmitted via telephone lines to a police station or central office. In some instances, a dedicated telephone line from the premises to the police station is used. Alternatively, a shared telephone line may be used and a particular signal is issued on the telephone line corresponding to the alarm condition that has occurred Conventional network telephone systems utilized in such an alarm system typically require transmission lines or cables from a local telephone company's central office to individual fixed locations, such as the home or office building. The telephone trunk lines entering the fixed location are connected to one or more individual telephone sets or to a switching unit that may be coupled to a PBX or other type of internal office system network.

In a telephone network system, when an alarm system is tripped at the protected premises, the telephone line is seized and loop current is produced. The telephone network's central office issues a dial-tone to the alarm system which upon recognition by the premises terminal dialer, the central monitoring receiver telephone number is automatically dialed. The central office of the telephone company then decodes the telephone number and a ring signal is sent to the alarm system central monitoring receiver. The central monitoring receiver responds by going "off-hook" and sends a handshake signal to the protected premises. The receiver at the protected premises responds to the handshake signal by sending data to the central receiver. If the data is sent and received correctly, the central monitoring receiver sends a "kiss-off" signal to the protected premises terminal, and the protected premises terminal responds to the "kiss-off" signal by returning an "on-hook" condition. At this point, the communication is completed until a new alarm is actuated.

From the above sequence of events, it is clear that the essential link between the protected premises and the alarm monitoring station or central office is the telephone line; however this link is also the weakest in the alarm system. The telephone line may be inadvertently cut such as by construction equipment, or deliberately cut by an intruder prior to his unlawful entry into the protected premises, such that no information would thereafter be transmitted to the central alarm monitoring station. Loss of this connection to the telephone exchange results in a loss of dial tone availability and loss of access to the central telephone network and alarm monitoring station. Even if the telephone line is intact, transmission failures may effect the operation of a telephone network land-line based alarm system. For example, a busy signal may appear on the telephone line resulting in loss of access to the central office and alarm-monitoring station. Additionally, inaccurate data transmission causing the receiver to reject the transmission, may result when the system goes "on-hook" at either the central office or at the alarm monitoring station without sending either a handshake signal, an acknowledge signal or a "kiss-off"

Therefore, although the telephone land-line based alarm system is generally satisfactory for providing communication between the protected premises and an alarm-monitoring station, a potential problem does exist with such systems. In an attempt to improve such systems, telephone systems utilizing cellular mobile radio telephones have been used in alarm systems. Cellular-type radio/telephone communication systems provide a wireless communication path between the protected premises and the central office of the telephone network, thereby minimizing several of the problems associated with telephone lines. Such a wireless alarm system is described in U.S. Pat. No. 4,577,182, issued to James W. Millsap et al. on Mar. 18, 1986 and entitled "Alarm System". However, existing cellular-type radio/telephone communication systems require complex programming of the cellular transceiver to dial telephone numbers of the alarm monitoring station. These systems require complex communicators with their associated high costs and reliability problems which effect the overall integrity of the alarm system.

A need has thus arisen for an efficient, cost-effective and reliable cellular-type radio/telephone communication system included within an alarm system to provide wireless communication. Additionally, in order to enhance the desirable features of conventional telephone network based systems utilizing land lines in alarm systems, a need has arisen for a system in which a redundant, backup communication path exists in the form of a wireless communication path.

SUMMARY OF THE INVENTION

In accordance with the present invention, an alarm system for a protected premises is provided. The alarm system includes an alarm sensor for generating and transmitting an alarm signal along an alarm signal line in the event of an alarm condition. A cellular-type radio/telephone transceiver is located at the protected premises and includes circuitry for generating a unique identification number of the transceiver and a send signal for wireless communication with a cellular site. Structure is provided for connecting the alarm signal line to the cellular-type radio/transceiver such that upon receipt of the alarm signal, the cellular-type radio/transceiver will transmit the unique identification number and the send signal to the cellular site with no transmission of the telephone number of an alarm monitoring station to thereby enable the cellular site to transmit the alarm condition to the alarm monitoring station.

In accordance with another aspect of the present invention, a redundant alarm for a protected premises is provided. The alarm system includes alarm sensors for generating an alarm signal along an alarm signal line in the event of an alarm condition at the protected premises. A telephone system located at the protected premises is connected to telephone subscriber lines of a telephone exchange system for communication with a monitoring station. The telephone system is also connected to the alarm signal line. The telephone system includes circuitry for automatically dialing the telephone number of the monitoring station upon receipt of the alarm signal on the alarm signal line for placing a telephone call via the telephone exchange system to the monitoring station to identify the protected premises having an alarm condition. The alarm system further includes a cellular-type radio/telephone communication system having a cellular-type radio station transceiver located at the protected premises and connected to the alarm signal line to provide wireless communication with a mobile cellular-type switching center. The mobile cellular-type switching center is linked to the monitoring station via the telephone exchange system. The cellular-type radio station transceiver includes circuitry for automatically generating a unique identification signal to the mobile cellular-type switching center. Circuitry is provided which is responsive to the alarm signal for detecting a failure in the telephone system located at the protected premises or for detecting a failure of the subscriber line and for generating a failure signal. Circuitry is further provided for enabling the cellular-type radio station transceiver, upon detection of the failure signal to transmit the unique identification signal to the mobile cellular-type switching center to thereby identify the protected premises having the alarm condition without transmission of the telephone number of the monitoring station. The mobile cellular-type switching center thereafter communicates with the monitoring station via the telephone exchange system to identify the protected premises to the monitoring station.

BRIEF DESCRIPTION OF DRAWINGS

For a more complete understanding of the present invention and for further advantages thereof, reference is now made to the following Description of the Preferred Embodiments taken in conjunction with the accompanying Drawings in which:

FIGS. 5 and 5a illustrate flow diagrams for the operation of the interface circuit.

DESCRIPTION OF THE PREFERRED EMBODIMENT

Figure 1:
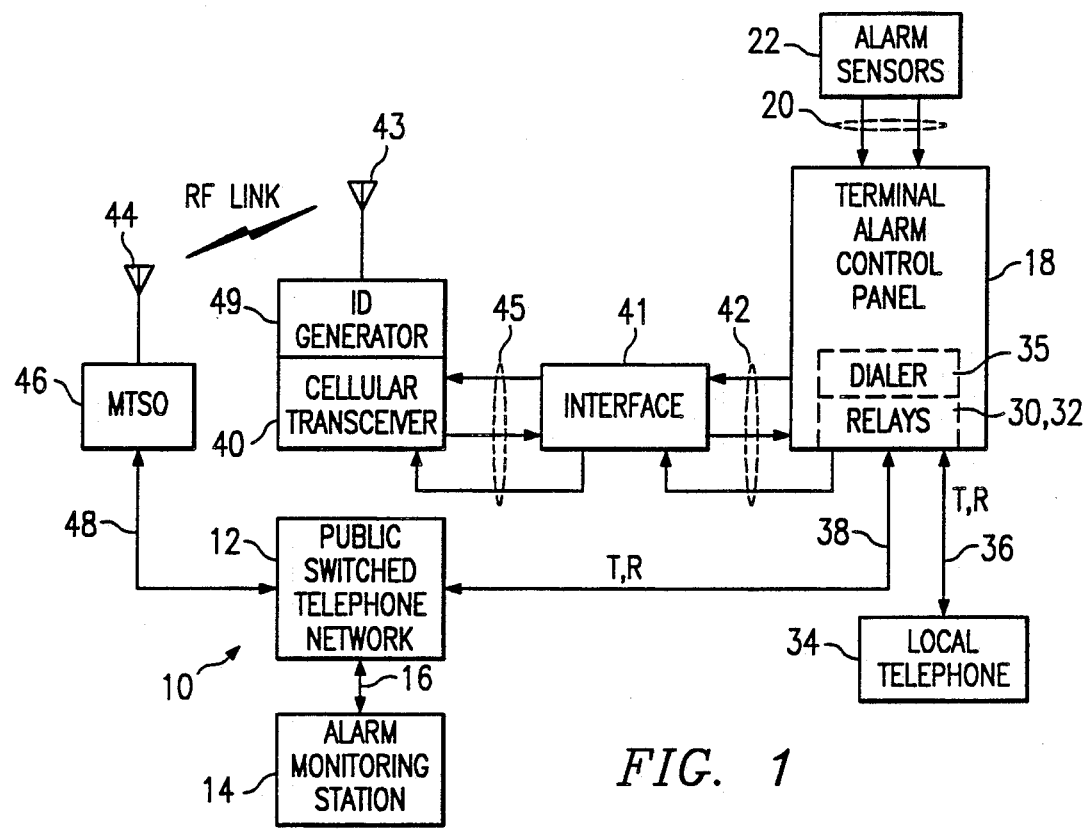
FIG. 1 is a functional block diagram of the present alarm system.

Referring to FIG. 1, a block diagram of one embodiment of the present alarm system, generally identified by the numeral 10 is illustrated. Alarm system 10 includes both a land-based communication path and a wireless communication path between a protected premises and a public switched telephone network 12 in order to communicate the existence of an alarm condition between the protected premises and an alarm monitoring station 14. Public switched telephone network 12 communicates with alarm monitoring station 14 via telephone line 16. Alarm system 10 may be physically installed at any convenient location within a residence, office building, manufacturing facility, or other premises that is to be protected.

Located at the protected premises is a terminal alarm control panel 18 which is of a conventional type and includes a plurality of input lines 20 from alarm sensors 22. Alarm sensors 22 initiate various alarm reports such as fire, burglary, panic, motion detection or the like, and are well known in the art. Input lines 20 may also be connected to alarm sensors located at different protected locations, with the various locations utilizing the same terminal alarm control panel 18.

Terminal alarm control panel 18 includes a line seizure relay 30 and a line pulse relay 32 which upon receipt of an alarm signal from alarm sensors 22 via signal lines 20, close to thereby connect a local telephone 34 via telephone line 36 to a subscriber telephone line 38 which is connected to public switched telephone network 12. Telephone line 36 and subscriber telephone line 38 each include tip (T) and ring (R) signal lines. Communication is thereby established between the protected premises and the public switched telephone network 12 via subscriber line 38 which is the land-based portion of the present alarm system 10. Communication is thereafter passed from public switched telephone network 12 to the alarm monitoring station 14. Terminal alarm control panel 18 may include automatic dialing circuits 35 for dialing the telephone number of the alarm monitoring station 14 via subscriber telephone line 38 or the telephone number may be dialed from local telephone 34 via telephone line 36. The basic land-based portion of alarm system 10 may comprise, for example, a system manufactured by ATT, Model no. 8000, which is described in an operating manual entitled "ATT Security System 8000", which manual is incorporated herein by reference. A land-based alarm system is also described in U.S. Pat. No. 4,465,904, issued to Ronald B. Gottsegen et al. on Aug. 14, 1984 and entitled "Programmable Alarm System" which disclosure is incorporated herein by reference.

Briefly, a communication path is established between terminal alarm control panel 18 and public switched telephone network 12 upon the closure of line seizure relay 30 and line pulse relay 32 upon receipt of an alarm condition from alarm sensors 22. Closure of relays 30 and 32 connects the dialer circuits of terminal alarm control panel 18 or local telephone 34 to public switched telephone network 12 which causes line current to flow through subscriber telephone line 38 establishing a dial tone. The dial tone is present for approximately two seconds after a settling period. The dialer of terminal alarm control panel 18 recognizes the dial tone which causes line pulse relay 32 to open for approximately 0.1 second. The dial tone then disappears and the dialer relay within terminal alarm control panel 18 begins pulse dialing the alarm monitoring station telephone number or, optionally, the line pulse relay 32 closes and the telephone number of alarm monitoring station 14 is transmitted in DTMF code. The public switched telephone network 12 then rings alarm monitoring station 14 whereupon the receiver of alarm monitoring station 14 goes "off hook" and transmits a handshake signal to terminal alarm control panel 18, typically in the form of a tone. Terminal alarm control panel 18 then sends an account code followed by the alarm code separated by an acknowledged signal from the alarm monitoring station 14. If the data matches, alarm monitoring station 14 sends a "kiss-off" signal and goes "on-hook". Terminal alarm control panel 18 interprets the "kiss-off" signal as a successful communication and goes "on-hook", opening line seizure relay 30 and line pulse relay 32 in readiness for a future alarm communication.

An important aspect of the present invention is the provision of a redundant communication path between terminal alarm control panel 18 and public switched telephone network 12 in the event of a failure of the land-based portion of alarm system 10. Alarm system 10 further includes a cellular type radio/telephone system including a cellular transceiver 40 connected to terminal alarm control panel 18 through an interface 41. Interface 41 is connected to the alarm control panel 18 through signal lines 42 and to the cellular transceiver 40 through signal lines 45. Cellular transceiver 40 may comprise, for example, a Model CP1100 manufactured and sold by Unidyn. When an alarm condition exists at the protected premises, cellular transceiver 40 transmits a radio frequency signal via an antenna 43 to an antenna 44 of a mobile telephone switching office (MTSO) 46. MTSO 46 is interconnected to public switched telephone network 12 via a four-wire E&M trunk 48 which carries both voice and signalling information.

An important aspect of the present wireless communication path of alarm system 10 is that cellular transceiver 40 functions to only generate a mobile identification number with an ID Generator 49, the identification number uniquely associated with the protected premises and a serial number installed at the time of manufacture in cellular transceiver 40. These two pieces of information are normally generated in a cellular-type radio/telephone communications system together with the telephone number of the called party. However the present invention utilizes only the mobile identification number and the serial number at the MTSO 46 which is programmed upon receipt of this data to signal alarm monitoring station 14 via public switched telephone network 12 without the use of the telephone number of alarm monitoring station 14.

Cellular transceiver 40 and MTSO 46 operate such that the only call that can be placed by the cellular radio communication system of alarm system 10 is to alarm monitoring station 14. All other calls are blocked by MTSO 46 and automatically result in a call to alarm monitoring station 14. No keypad is required at cellular transceiver 40 for the dialing of a called party from the protected premises. Such a cellular-type radio/telephone communication system is typically referred to as a "hot-line" system in which only one communication path can be established between the cellular transceiver and the ultimate called destination, similar to a private line service of a public switched telephone system. The only call-identifying information received by MTSO 46 is the mobile identification number and the serial number of cellular transceiver 40 in order to affect the wireless communication path between the protected premises and alarm monitoring station 14. In general, operation of a cellular-type radio/telephone communication system is described in a publication entitled "Southwestern Bell Cellular Service System Description" published by Southwestern Bell Telephone Company, copyright 1985, which disclosure is incorporated herein by reference. An additional cellular-type radio/telephone communication system in which a telephone number of the alarm monitoring station is dialed is described in U.S. Pat. No. 4,577,182, which disclosure is incorporated herein by reference.

In operation of the hot line system at the MTSO 46, a call is initially placed from the cellular transceiver 40 to the MTSO 46 over the RF link. Typically, a cellular transceiver will make this call by activating the transmitter and sending the telephone number of a desired party followed by the mobile identification number and the serial number of cellular transceiver 40. In the hot line system, the MTSO 46 ignores the number of the desired party and routes the call to a pre-determined number, which in the present invention is the number of the alarm monitoring station 14. As will be described hereinbelow, this is important in that a handset for the cellular transceiver 40 is no longer required, nor is any programming at the cellular transceiver 40 required. The mere operation of attempted access to the MTSO 46 by the cellular transceiver 40 results in a call being placed to the alarm monitoring station 14. This programming is done at the MTSO 46.

Another aspect of utilizing the hot line system with the MTSO 46 is that calls going through the MTSO 46 to the cellular transceiver 40 can be blocked. For example, if an individual tried to interfere with transmission of a cellular transceiver 40 by placing a call to that cellular transceiver, the MTSO 46 would route this call to a different number or would provide a busy signal. This, in effect, would provide a dedicated "send only" channel for the cellular transceiver 40, thus improving the security aspect of the alarm system of the present system.

Cellular transceiver 40 in combination with terminal alarm control panel 18 and interface 41 generates the "send" signal in order to transmit the mobile identification number and serial number of the cellular portion of alarm system 10. When cellular transceiver 40 goes "off-hook" the send signal is automatically generated in order to transmit data from cellular transceiver 40 to MTSO 46. Various systems are available for generating the "send" signal through hardware and software control. Various type actuating circuits are described in U.S. Pat. No. 4,658,096 issued to William L. West, et al. on Apr. 14, 1987 and entitled "System for Interfacing a Standard Telephone Set with a Radio Transceiver", which description is hereby incorporated by reference.

Figure 2:
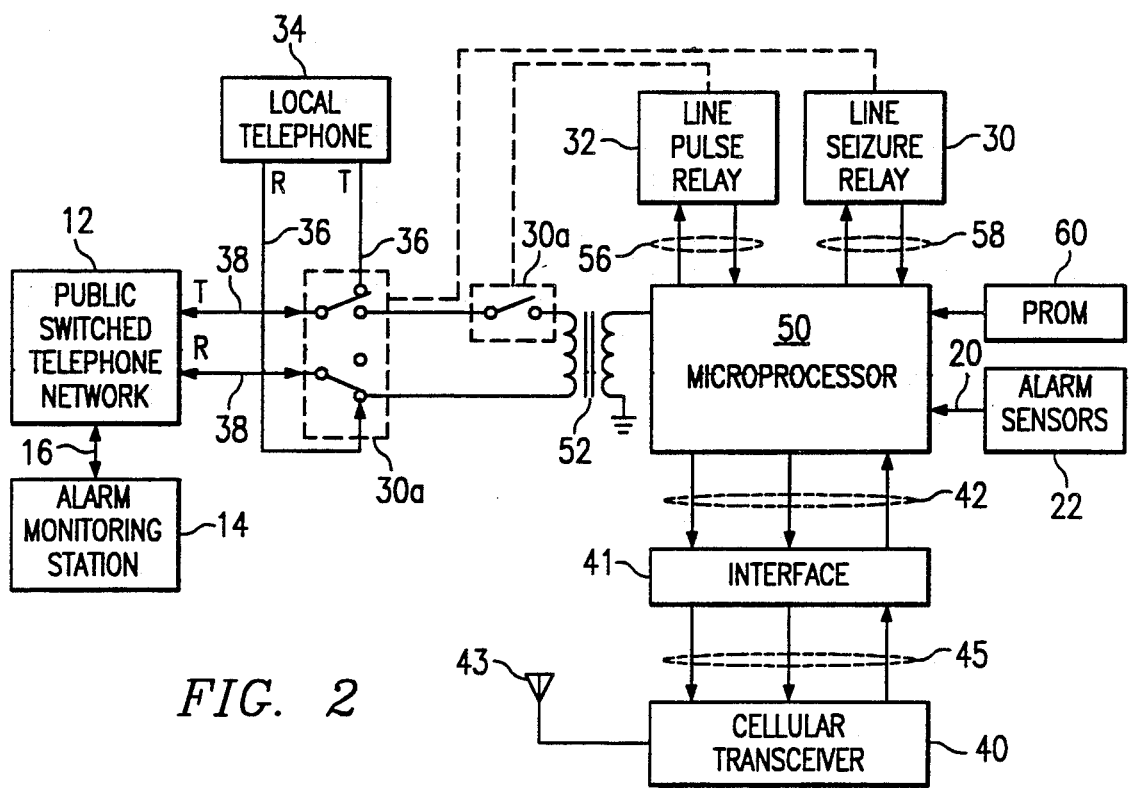
FIG. 2 is a functional block diagram of the terminal alarm control panel illustrated in FIG. 1;.

Referring simultaneously now to FIGS. 1 and 2, a more detailed description of the operation of one embodiment of the alarm system 10 will be provided. As previously stated, the land-based portion of alarm system 10 operates by seizing the subscriber telephone line 38 in order to effectuate communication to public switched telephone network 12 in a manner well-known to those skilled in the art. In the event of a failure in the land-based portion of alarm system 10, the cellular communication system is utilized to provide a redundant communication path between the protected premises and the alarm monitoring station 14. FIG. 2 illustrates the use of a microprocessor 50 which is internal to the alarm control panel 18 and which functions to automatically dial the telephone number of alarm monitoring station 14 in the land-based portion of alarm system 10. Microprocessor 50 is connected by a coupling transformer 52 to local telephone 34 and subscriber telephone line 38. The telephone number of alarm monitoring station 14 is dialed through line pulse relay 32 which controls a switch 32a. Microprocessor 50 also controls line seizure relay 30 which controls switches 30a for seizing line 38.

In a normal situation, line seizure relay 30 and line pulse relay 32 will actuate, thus connecting microprocessor 50 to subscriber telephone line 38; however, if there is a failure in subscriber telephone line 38 and the dial tone is not present to terminal alarm control panel 18, line pulse relay 32 will remain open. The condition of line seizure relay 30 being closed and line pulse relay 32 being open is recognized as a fault condition by microprocessor 50 which communicates with line pulse relay 32 via signal lines 56 and line seizure relay 30 via signal lines 58. When this fault condition exists, microprocessor 50 in conjunction with interface 41 latches line pulse relay 32 off and enables cellular transceiver 40 via signal lines 45 to transmit the mobile identification number and serial number of the cellular communication system. The mobile identification number and serial number of the cellular system is stored internal to the cellular transceiver 40.

A second type failure in the land-based system of alarm system 10 may occur after a dial tone is present and terminal alarm panel 18 has dialed the number of alarm monitoring station 14 but there is a failure in transmission of alarm monitoring station 14 over subscriber telephone line 38. In this type of fault, line pulse relay 32 has closed switch 32a and microprocessor 50 monitors for the receipt of a handshake signal from public switched telephone network 12. If the handshake signal is not received within a predetermined amount of time, microprocessor 50 in conjunction with interface 41 enables cellular transceiver 40.

Figure 3:
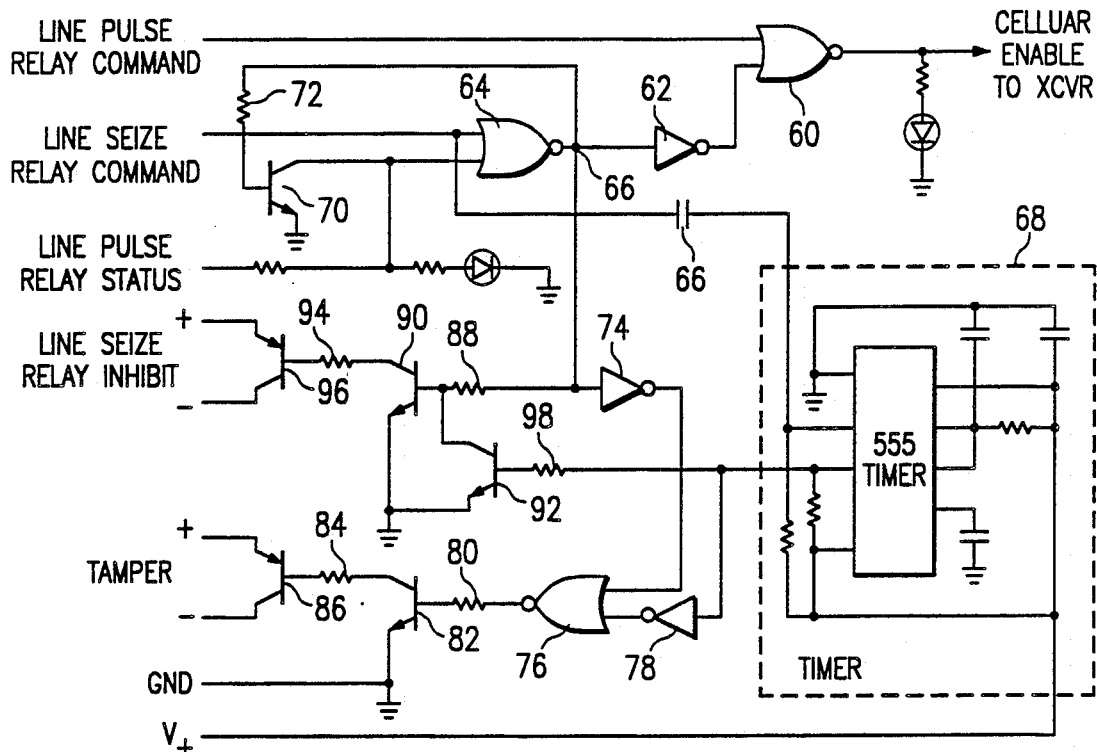
FIG. 3 illustrates a logic diagram of one embodiment of the, interface circuit.

Referring now to FIG. 3, there is illustrated a logic diagram of the interface circuit 41. The microprocessor 50 on the alarm control panel 18 outputs a line pulse relay command which is input to one input of a NOR gate 60, the output of which provides the enable signal for the cellular transceiver 40. The other input thereof is connected to the output of a inverter 62, the input of which is connected to the output of a NOR gate 64 on a node 66. One input of NOR gate 64 is connected to a line seize relay command on the output of the microprocessor 50 in the alarm panel 18 and also to one side of a capacitor 66. The other side of capacitor 66 is connected to the input of a timer circuit 68. The timer circuit 68 utilizes a conventional 555 timer in a monostable configuration to act as a timer. The second input of NOR gate 64 is connected to the collector of an NPN transistor 70, the emitter of which is connected to ground and the base of which is connected through a resistor 72 to node 66. Node 66 is also connected through an inverter 74 to one input of a NOR gate 76. The other input of NOR gate 76 is connected through an inverter 78 to the output of the timer 68. The output of NOR gate 76 is connected through a resistor 80 to the base of an NPN transistor 82, the emitter of which is connected to ground and the collector of which is connected through a resistor 84 to the base of a PNP transistor 86. The emitter and collector of transistor 86 are connected to the tamper connections on the alarm panel 18.

Node 66 is also connected through a resistor 88 to the base of an NPN transistor 90 and to the collector of an NPN transistor 92. The emitter of transistors 90 and 92 are connected to ground with the collector of transistor 90 being connected through a resistor 94 to the base of the PNP transistor 96. The emitter of transistor 96 is connected to a positive voltage and the collector thereof is connected to a line seize relay inhibit signal. The base of transistor 92 is connected through a resistor 98 to the output of the timer 68.

When an alarm signal has been set, the line seize relay command goes low. The line pulse relay status signal goes high when the alarm has been set causing the output of NOR gate 64 to go low. The low output of NOR gate 64 inverted by inverter 62 causes the output of NOR gate 60 to be at a low level. The line pulse relay command and the other input of the NOR gate 60 go low when the alarm is set. If the line seize relay command is low and the alarm pulse relay status is low, a fault condition exists. This condition results in a pre-enable high signal at the output of the NOR gate 64. When the output of NOR gate 64 is high, it causes transistor 90 to conduct. When transistor 90 conducts, transistor 96 conducts causing the line seize relay 30a to be inhibited since the driver therefore is inhibited. This is the latch open condition for the line seize relay which occurs after the land line path fails. Simultaneously, when the output of NOR gate 64 (pre-enable) goes high, the output of inverter 74 goes low resulting in a low on one input of NOR gate 76. The low state of the line seize relay command commands the relay 30a to close. This event triggers the timer circuit 68 for a period of approximately fifteen seconds. This period is chosen to exceed the waiting period of the line seize relay 30a which is approximately ten seconds by an additional interval of approximately five seconds.

If the land line fails, the line pulse relay status signal is low and the line seize relay command is low, resulting in the five second interval which causes transistor 82 and transistor 86 to conduct, causing a tamper alarm pulse. Otherwise, if the line pulse relay status is high and the line seize relay command is high, the land line is available and the tamper alarm sample function is generated, but the five second tamper pulse is not generated resulting in no tamper alarm. The tamper alarm is produced only if the telephone company dial tone is not available. This occurs immediately after the fifteen second delay. If no dial tone is available, the dialer is programmed to open the pulse relay 32a with the line seize relay command being low. If the dial tone is present, the dialer will keep the pulse relay 32a closed and the line seize relay command will remain low until a transmission fault occurs approximately thirty seconds later or until a successful communication occurs.

If a transmission fails, the line pulse relay command goes high, indicating an off condition for approximately ten seconds causing the output of NOR gate 60 to go low for ten seconds. This feature prevents false cellular transmission until the microprocessor 15 in the alarm panel 18 resets.

Figure 4:
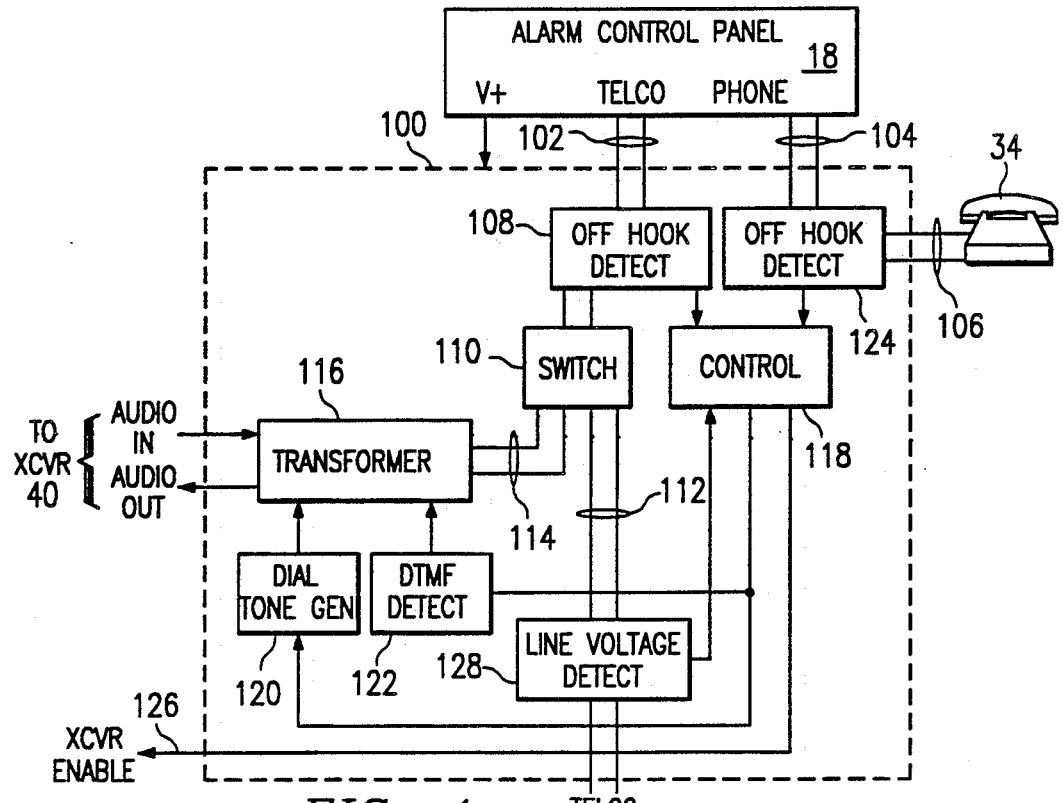
FIG. 4 illustrates a block diagram of the preferred embodiment of the interface circuit.
Figure 6A:
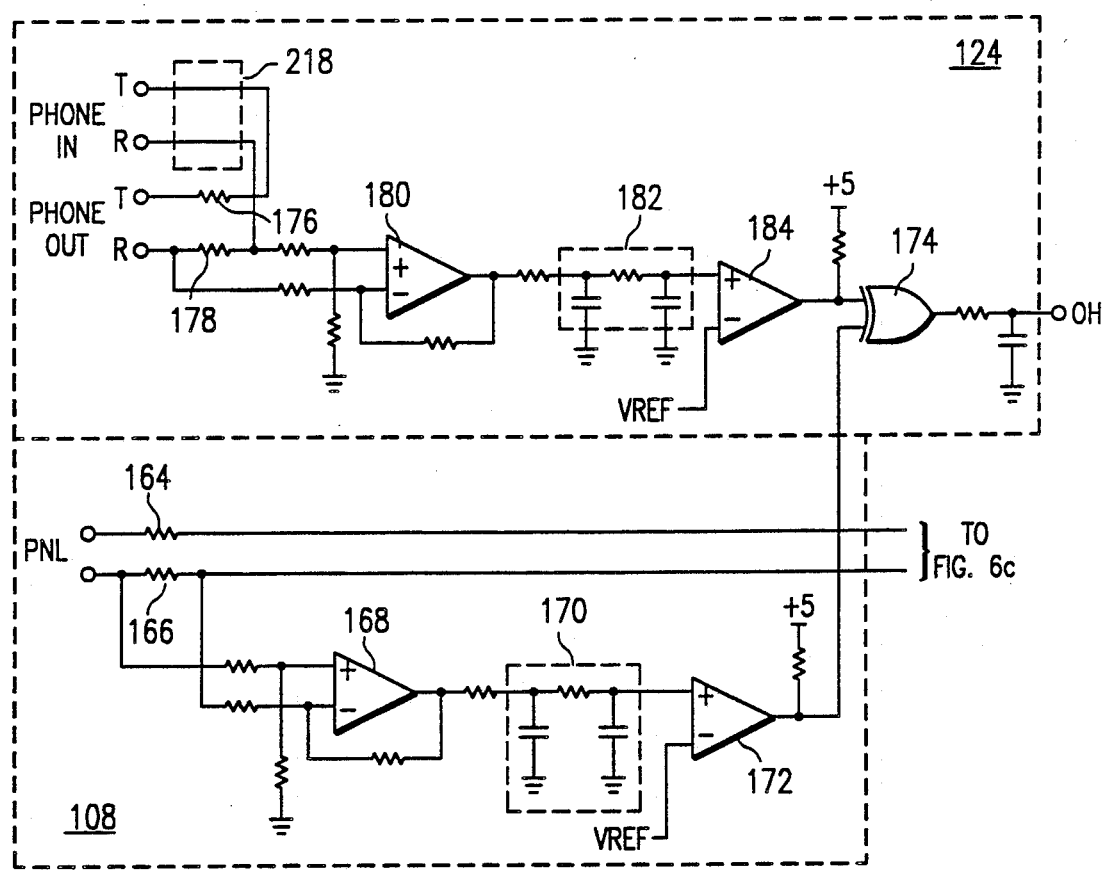
FIGS. 6a–6e illustrates a logic diagram of the circuit of FIG. 4.
Figure 6C:
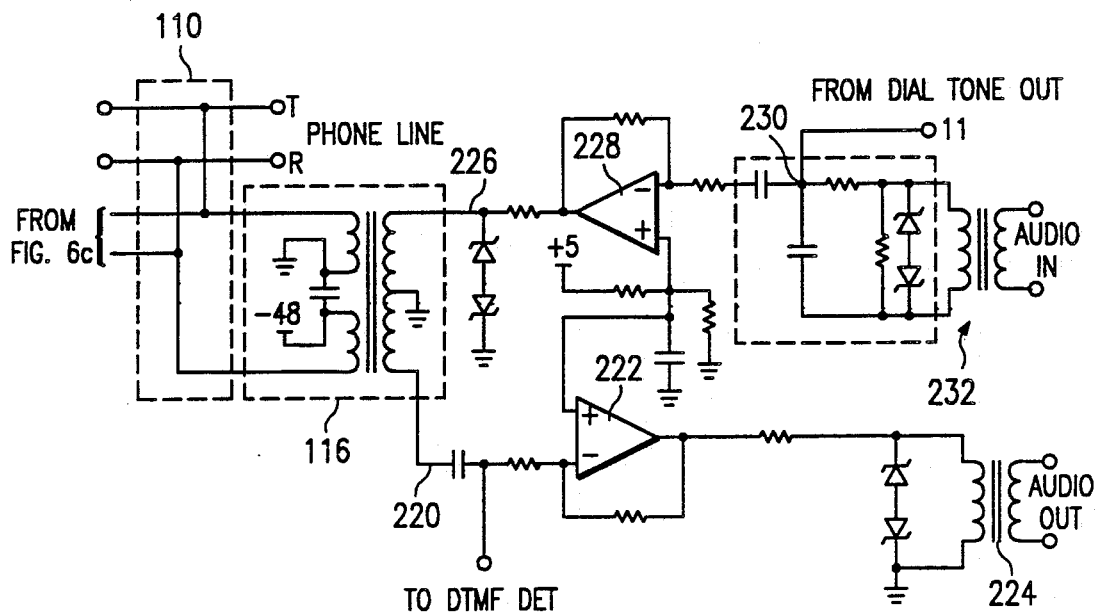
Figure 6B:
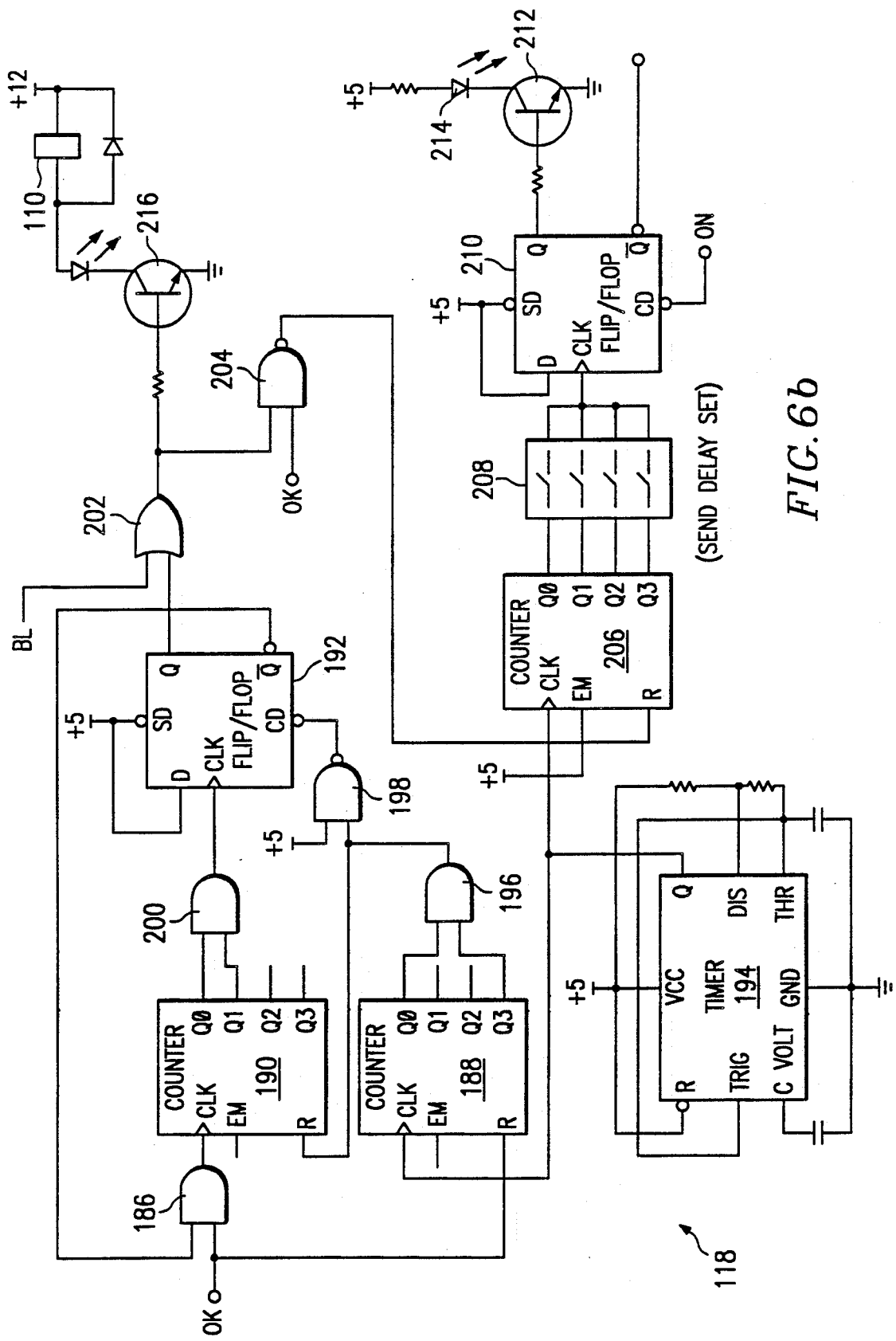
Figure 6D:
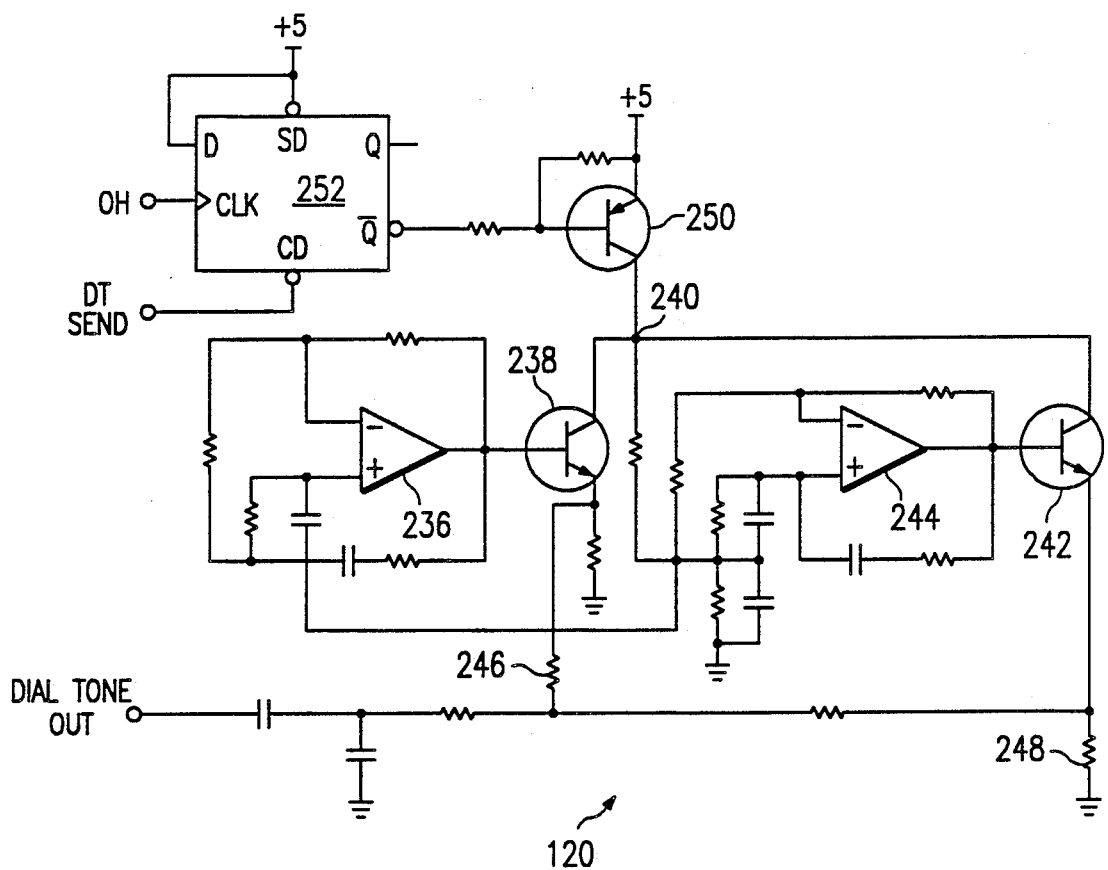
Figure 6E:
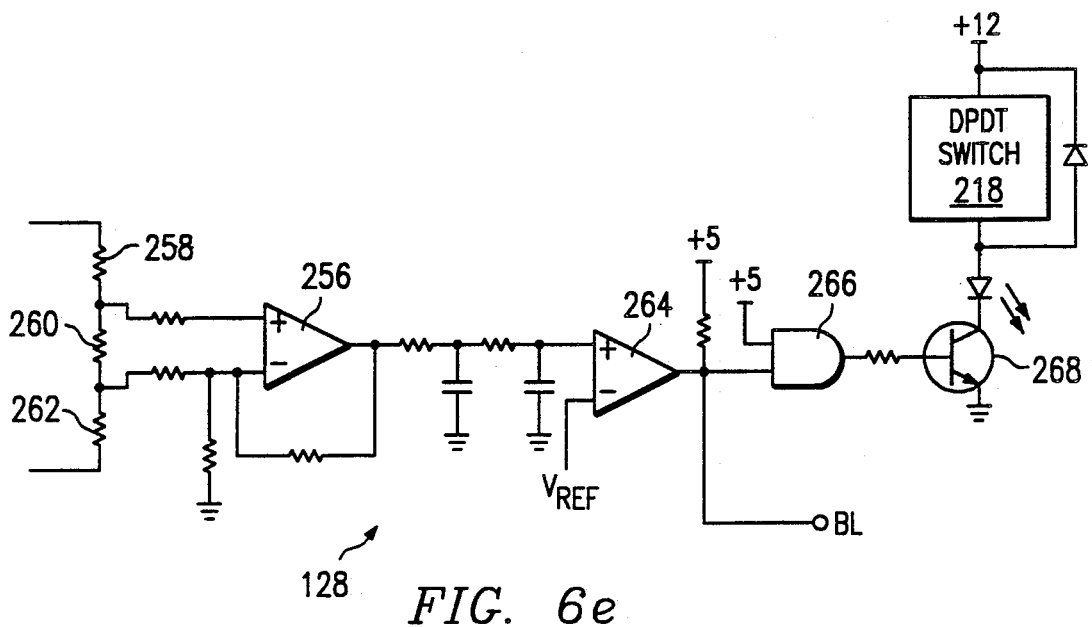

Referring now to FIG. 4, there is illustrated the preferred embodiment of the present invention. The alarm panel 18 is illustrated as having an output for the telephone line labelled "Telco" and a local phone output labelled "Phone". In addition, there is a positive supply output $V_+$. In operation, the main telephone line is brought into the "Telco" input and then a local phone connected to the "Phone" input. Whenever an alarm status is generated, the alarm panel 18 seizes the line such that the local telephone 34 is disconnected and goes off-hook for a short period of time to insure that any previous call was disconnected. The alarm panel then goes off-hook to effect a connection with the central office.

In the preferred embodiment, an interface panel 100 is provided that is operable to interface between the public switched telephone network 12 and the cellular transceiver 40. The "Telco" input to the alarm panel 18 is connected to the interface panel 100 through a line 102 and the "Phone" input to the alarm panel 18 is connected to the interface panel through a line 104. In addition, the local telephone 34 is connected to the interface panel 100 through a line 106.

In operation, the interface panel 100 detects the presence of an off-hook condition and the sequence thereof to determine whether a connection with the central office has been made or not. It is not necessary to actually monitor the exchange of information between the alarm panel and the central office but, rather, merely monitor the sequence of accesses or attempted accesses output by the alarm panel 18.

In general, an alarm panel is set up to attempt access to the central office multiple times in the event of a failure. For example, if there is a land line failure, the alarm panel 18 cannot make this determination but, rather, merely continues attempted accesses to the land line. A typical sequence is that the alarm panel 18 first goes off-hook and senses the presence of a dial tone. When the dial tone is present, digits are dialed out indicating the telephone number of the central office. When the central office answers, a handshake tone is transmitted from the central office to the alarm panel followed by transmission of coded information and identification information from the alarm panel to the central office. Of course, when the land line has failed such that a dial tone is not present, the alarm panel 18 terminates the attempted access upon detecting the lack of the dial tone. After a short period of time, the alarm panel 18 again attempts access by trying to detect the presence of the dial tone. This will continue for as many as fifteen attempts. After fifteen attempts, some panels provide a longer duration of time, which may be up to forty-five minutes before attempting access again.

If the connection between the alarm panel 18 and the telephone company is present but the line between the telephone company and the central office is either interrupted, busy or generally not available, the dial tone will be present and the telephone number of the central office will be output from the alarm panel. However, if the handshake tone is not returned within a predetermined amount of time, the alarm panel 18 will go into an on-hook mode and wait a short period of time (about three seconds) and then reattempt access. This will continue for up to fifteen attempts, at which time the alarm panel 18 will either cease attempted access or wait a long period of time (i.e., approximately forty-five minutes) and then re-execute the attempt sequence. In any event, multiple attempts by the alarm panel 18 provide an indication that there is a problem with the telephone line at either the user's end or the central office end. It is the occurrence of the attempted access that is sensed by the interface panel 100 and, if the number of attempted accesses exceed a predetermined number, a switch is activated to place the cellular transceiver 40 into operation. Thereafter, any attempted access will result in a connection being made through the cellular system to by-pass the public switched telephone network 12 in accordance with the above-described method utilizing the hot line.

The line 102 on the interface panel 100 is input to an off-hook detect circuit 108, the output of which is input to a switch 110. The switch 110 has a first output 112 that is connected to the public switched telephone network 12 and a second output 114 which is input to a transformer 116. Switch 110 is controlled by a control circuit 118. In normal operation, the output of the hook-detect circuit 108 is routed to the public switched telephone network 12 through the line 112. However, when the control circuit 118 determines that there is a failure for whatever reason, the switch 110 connects the output of the off-hook detect circuit 108 to the line 114. In this mode, it is necessary to interface with the cellular transceiver 40. In this interface, it is necessary to be able to handle a separate audio input and provide a separate audio output, which input and output have an impedance of 600 Ohms. To accommodate this, a transformer is provided to provide both the impedance transformation isolating the audio input and audio output and also provide a loop termination for the line 114. Since the "Telco" input of the alarm panel 18 requires the presence of the voltage and impedance for a standard telephone line, it is necessary to provide the loop termination at the appropriate voltage consistent with the operation of a conventional telephone line. Further, a dial tone must be generated by dial tone generator 120, which is also controlled by the control circuit 118, in addition to the detection of the DTMF digits in a detector 122.

Since the interface panel 100 operates by detecting the presence of an off-hook condition and the sequence thereof, it is necessary to determine whether the off-hook condition was generated by the alarm panel 18 or by the local telephone 34. The interface panel 100 does not have access to the internal connections of the alarm panel 18 and can therefore not determine whether the line has been seized. Therefore, the line for the local telephone 34 is routed through the panel 18 via lines 104 and 106 and an off-hook detect circuit 124. The status of the off-hook detect circuit 124 and the status of off-hook circuit 108 allow the control circuit 108 to determine whether the off-hook condition is due to the alarm panel 18 or to the local telephone 34. The control circuit 118 also outputs a transceiver enable signal on a line 126 to the cellular transceiver 40.

Referring now to FIG. 5, there is illustrated a flow chart illustrating the operation of the control circuit 118. After the system is initialized in a start block 130, an internal counter is set to a count value of zero, as indicated by function block 132. The circuitry then makes a decision whether there is a main off-hook condition, as indicated by the off-hook detect circuit 108. This is represented by a decision block 134. The circuitry continues to wait for the off-hook condition until it is present and then the status of the off-hook detect circuit for the remote telephone 34 is examined to determine if the local telephone 34 is off-hook. This is indicated by a decision block 136. If the local phone is off-hook, the system returns to wait for the next sequential off-hook. However, if both an off-hook condition is detected from the off-hook detect circuit 108 and no off-hook detect circuit is detected from the off-hook detect circuit 124, this indicates an attempted access by the alarm panel 18. The count value in the counter is then examined to determine if it is greater than or equal to two. If it is less than two, this indicates an early attempt by the alarm panel 18 to communicate through the public switched telephone network 12 and the system waits for an on-hook condition as indicated by the decision block 140.

When an on-hook condition is present, the internal counter is incremented, as indicated by a function block 142, and then the system waits for another off-hook condition to occur, as determined by the decision block 134. However, a time-out function must also be checked, as indicated by a function block 144 to determine the duration of time between the initial off-hook and the on-hook condition. Initially, the time-out is initiated when an off-hook condition is encountered for the first time. If a second off-hook indication is not received during a predetermined duration of time, as would be required for a normal communication, this would indicate access and the count value would be set equal to zero before the next off-hook condition occurs.

After the alarm panel 18 has attempted access twice within the predetermined time constraints, the third access attempt results in the count value being equal to three and the operation indicated by decision block 138 results in the switch 110 being switched over to the path 114, as indicated by function block 146. An internal timer has its time value set equal to zero, as indicated by a function block 148, and then the time value is incremented, as indicated by function block 150, i.e., the timer is started. The timer will continue to run until the timer has reached a maximum value. This function is indicated by function block 152. Once the timer has reached the maximum value, the switch 110 is switched back to the "Telco" line 112 to interface with the public switched telephone network 12. This is indicated by a function block 154. However, if before the timer has reached the maximum value and the local telephone 34 has been taken off-hook, the switch 110 will automatically be switched back to the "Telco" line on line 112 to prevent routing of a call from the local telephone 34 through the cellular transceiver 40. As described above, connection of the local telephone 34 to the cellular transceiver would be inappropriate since the hot line system is utilized and no numbers can be received. Connection of the local telephone 34 to the cellular transceiver 40 would result in a call being automatically forwarded to the central office which is of no benefit and, in fact, could tie up valuable time on the cellular telephone network.

In another operation, as depicted in the flow chart in FIG. 5a, the line voltage of the telephone line is detected to determine if the line was in fact cut. If this happens, as indicated by a decision block 156, the switch 110 is switched over to the cellular operation, as indicated by function block 158. In addition, the local telephone 34 is inhibited as indicated by a function block 160.

Referring now to FIGS. 6a-6e, there is illustrated a schematic diagram of the interface circuit of FIG. 4. The off-hook detect circuit 108 is connected on the phone lines on the input to the switch 110, switch 110 illustrated in the normal position wherein the panel is connected to the telephone company output. A resistor 164 and a resistor 166 are placed in either of the two phone wires. The voltage across the resistor 166 is sampled by an operational amplifier (op amp) 168 which has a gain of approximately one that is defined with various series and feedback resistors. The output of the op amp 168 is input to a filter 170, the output of which is connected to the positive input of the comparator 172, the other input of which is connected to a reference voltage. The output of the comparator 172 is input to one input of a two input exclusive OR gate 174. The output of the exclusive OR gate 174 is filtered and provides the off-hook detect signal OH. In a similar manner, the off-hook detect circuit 124 has two series resistors 176 and 178, each disposed on one side of the phone line which is connected between the local phone 34 and the line 104. An op amp 180, similar to the op amp 168, is provided to sample the voltage across the resistor 178, the output of which is input through a filter 182 to the positive input of a comparator 184, the negative input of which is connected to a reference voltage of approximately 0.5 volts. The output of comparator 184 is input to the other input of the exclusive OR gate 174. Therefore, the OH signal is generated only when the panel is off-hook and not when the local telephone is off-hook.

The off-hook detect signal is input to the control circuit 118. The OH signal is input to one input of an AND gate 186 and also to the reset input of a counter 188. The output of AND gate 186 is input to the clock input of an event counter 190. The other input of the AND gate 186 is connected to the Q-bar output of a D-type flip flop 192. A clock circuit is provided utilizing a timer circuit 194 which is comprised of an LM555 timer configured as a bi-stable multivibrator. The output of timer 194 is input to the clock input of the counter 188. The Q and Q3 outputs of counter 188 are input to two separate inputs of an AND gate 196, the output of which is connected to one input of a NAND gate 198. The output of AND gate 196 is also input to the reset input of the counter 190. The output of the NAND gate 198 is input to the clear input of the D-type flip flop 192.

The counter 190 has the Q$\phi$ and Q1 outputs thereof connected to separate inputs of an AND gate 200, the output of which is connected to the clock input of the D-type flip flop 192. The data input thereof is connected to a positive voltage. The output of flip flop 192 is connected to one input of an OR gate 202, the other input of which is connected to a blanking signal BL from the line voltage detect circuit 128. The output of OR gate 202 is connected to one input of an AND gate 204, the other input of which is connected to the off-hook detect signal. The output of NAND gate 204 is connected to the reset input of counter 206. The clock input of counter 206 is connected to the output of timer 194, the counter 206 providing a delay count. The four bits of output Q$\phi$-Q3 are connected to four separate inputs of a DIP switch 208. All the outputs of DIP switch 208 are connected together into the clock input of a D-type flip flop 210, the D-input of which is connected to a positive voltage and the clear input of which is connected to the OH signal. The Q-output of flip flop 210 is input to the base of the transistor 212 which drives an LED 214 to provide an indication that a SEND signal has been generated. Whenever the OH signal is generated, a delay is provided by the clock 206 to clock the flip flop 210 after the predetermined delay, thereby generating the SEND signal on the Q-bar output of flip flop 210 after the predetermined delay from the time the OH signal is generated.

Whenever the OH signal is generated, the counter 190 is incremented. Initially, the counter 190 is set to a zero value by the time out of counter 188. At the first OH signal, counter 188 is reset and counter 190 is incremented. At the third OH, the output of gate 200 goes high and clocks a logic high on the output of flip flop 192, which state remains there until counter 188 times out. The time out of counter 188 occurs approximately thirty seconds after the last OH has been received.

The generation of the off-hook detect signal causes the output of OR gate 202 to drive a transistor 216 which drives the relay 110. Therefore, whenever the OH signal is detected a predetermined number of times as determined by the event counter 190, the output of the OR gate 202 goes high and closes relay 110 to inhibit and also gate the output of the NAND gate 204 to operate in conjunction with the OH signal. Thereafter, when the OH signal is generated, the SEND signal is generated on the Q-bar output of flip flop 210 after the predetermined delay. The transformer 116 has an audio-out line 220 which is input to an op amp 222 with a gain associated therewith. The output of the op amp 222 is input to a transformer 224 to provide a 600 Ohm audio output. In a similar manner, an audio receive line 226 for the transformer 116 is connected to the output of an op amp 228, the input of which is connected to a summing junction 230. Summing junction 230 receives the output of an audio-in transformer 232 and also receives a dial-tone from the dial-tone generator 120. In a similar manner, the DTMF detect circuit 122 is connected to the line 220.

The dial-tone generator 120 is comprised of an op amp 236 configured as an oscillator, the output of which drives the gate of a transistor 238. The clock of the transistor 238 is connected to a node 240 which is also connected to the collector of a transistor 242. A second op amp 244, configured similar to the op amp 236, is connected to the gate of the transistor 242. This provides summing of two separate tones. The transistors 238 and 242 are connected as emitter followers with the emitters thereof connected through resistors 246 and 248, respectively, to provide the dial-tone output. The summing node 240 is also connected to the collector of the PNP transistor 250, the base of which is connected to the Q-bar output of a D-type flip flop 252. Flip flop 252 has a clock input thereof connected to the OH signal and the clear input thereof connected to the SEND signal.

The line-voltage detect circuit 128 is comprised of an op amp 256 for detecting the voltage cross align which is divided down by two voltage divider circuits comprised of three series connected resistors, a resistor 258, a resistor 260 and a resistor 262. Resistors 258 and 262 are disposed at either end of the divider and have a value of one MEGOhm and the resistor 260 is disposed therebetween and has a value of approximately 47 KOhm. The voltage across resistor 260 is measured by op amp 256, the output of which is then input through a filter circuit to a comparator 264 on the positive input thereof. The negative input thereof is connected to a voltage reference. The output of comparator 264 is input to one input of an AND gate 266 which operates as a buffer with the other input thereof tied to a positive voltage. The output of comparator 264 also provides a blanking signal BL. The output of AND gate 266 is input to the gate of the transistor 268 which is operable to switch a relay 218. Therefore, the relay 218 is opened whenever the line voltage is removed. The relay 218 is inserted in series with the local telephone 34 and the off-hook detect circuit 124. The relay 218 functions to inhibit operation of the local telephone 34 whenever the panel has seized the line.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. An alarm system for a protected premises, comprising:
    an alarm sensor for generating an alarm signal in the event of an alarm condition at the protected premises, said alarm sensor including communication means to communicate said alarm condition to an alarm monitoring station;
    a cellular-type radio transceiver located at the protected premises including means for generating a unique identification number for wireless communication with a cellular site; and
    means for connecting said communication means to said cellular-type radio transceiver, such that upon generation of the alarm signal, said cellular-type radio transceiver will transmit said unique identification number and said send signal to the cellular site with no transmission of a telephone number of an alarm monitoring station to thereby enable the cellular site to establish a communication path between said communication means and said alarm monitoring station to allow the alarm condition to be communicated to the alarm monitoring station via said cellular-type radio-transceiver.

2. The alarm system of claim 1 wherein generation of the alarm signal causes said cellular-type radio transceiver to go off-hook in response to signals received from said communication means to thereby generate said unique identification number.

3. The alarm system of claim 1 wherein said unique identification number comprises a mobile identification number and serial number of said cellular-type radio transceiver.

4. An alarm system for a protected premises comprising:
    an alarm sensor for generating an alarm signal in the event of an alarm condition at the protected premises, said alarm sensor including communication means for establishing a communication link with an alarm monitoring station over a telephone line for communication of the alarm condition to said alarm monitoring station in response to the generation of said alarm signal;
    a cellular-type radio/telephone communication system having a cellular-type radio station transceiver located at the protected premises and connected to said alarm signal line to provide wireless communication to a mobile cellular-type switching center, said mobile cellular-type switching center being linked with a local telephone central office via telephone lines;
    said cellular-type radio station transceiver including means for automatically generating a unique identification signal in response to detection of signals from said communication means indicating an attempt by said communication means to establish a communication link with said alarm monitoring station; and
    sending means for enabling said cellular-type radio station transceiver to transmit said unique identification signal to said mobile cellular-type switching center without transmission of a telephone number, said mobile cellular-type switching center thereafter communicating with the local telephone central switching office via telephone lines.

5. The alarm system of claim 4 wherein said unique identification number comprises a mobile identification number and serial number of said cellular-type radio station transceiver.

6. A redundant alarm system for a protected premises, comprising:
   an alarm sensor for generating an alarm signal along an alarm signal line in the event of an alarm condition at the protected premises;
   a telephone communicator system located at the protected premises connected to a telephone subscriber line of a telephone exchange system for communication with a monitoring station, said telephone system further being connected to said alarm signal line;
   said telephone communicator system including means for automatically dialing the telephone number of the monitoring station upon receipt of said alarm signal on said alarm signal line for placing a telephone call via the telephone exchange system to the monitoring station in order to identify the protected premises having the alarm condition and communicate the alarm condition to the monitoring station;
   a cellular-type radio/telephone communication system, having a cellular-type radio station transceiver located at the protected premises and interfaced with said alarm signal line to provide wireless communication to a mobile cellular-type switching center, said mobile cellular-type switching center being linked to the monitoring station via said telephone exchange system;
   said cellular-type radio station transceiver including means for automatically generating a unique identification signal to said mobile cellular-type switching center;
   means responsive to said alarm signal for detecting a failure in said telephone system located at the protected premises or for detecting a failure of said subscriber line and for generating a failure signal;
   sending means for enabling said cellular-type radio station transceiver upon detection of said failure signal to thereby transmit said unique identification signal to said mobile cellular-type switching center to thereby identify the protected premises having the alarm condition without transmission of the telephone number of the monitoring station, said mobile cellular type switching center thereafter communicating with the monitoring station via the telephone exchange system.

7. The redundant alarm system for claim 6 wherein said failure signal disables said telephone system located at the protected premises.

8. The redundant alarm system of claim 6 wherein said unique identification number comprises a mobile identification number and the serial number of said cellular-type radio station transceiver.

9. The redundant alarm system of claim 6 wherein said failure signal causes said cellular-type radio station transceiver to go off-hook to thereby generate said unique identification number.

10. An alarm interface unit for interfacing between an alarm system and the public telephone system, the alarm system operable to access an alarm monitoring station through the public telephone system by outputting a call to the alarm monitoring station followed by access signals for transmission over the public telephone system, failure to access the alarm monitoring station by the alarm system resulting in repeated generation of the call on a periodic basis by the alarm system, the alarm interface comprising:
   a communication port for receiving the outgoing calls from the alarm system which are directed to the alarm monitoring station, which outgoing calls are generated by the alarm system in response to an alarm condition being present;
   priority communication means for communicating between the alarm system and the alarm monitoring station via the public telephone system in response to access signals from the alarm system;
   secondary communication means for communicating between the alarm system and the alarm monitoring station via the public telephone system in response to access signals from the alarm system and the presence of a failure signal, said priority communication means inhibited during the presence of said failure signal; and
   detection circuitry for detecting a predetermined number of access attempts by the alarm system through said priority communication means to access the alarm monitoring station via the public telephone system, said detection circuitry generating said failure signal in response to the detection of said predetermined number of access attempts.

11. The alarm interface unit of claim 10 wherein the alarm system interfaces with the public telephone system through a telephone output and said communication port comprises a telephone port for receiving the telephone output of the alarm system.

12. The alarm interface unit of claim 11 wherein said priority communication means and said secondary communication means comprise:
   a switch having an input connected to the telephone port of the alarm interface and having first and second outputs;
   a first output port including means for interfacing with the public telephone system and for receiving the first output of said switch;
   a second output port for receiving the second output of said switch and including means for interfacing with the public telephone system; and
   switch control circuitry for switching said switch to said second output in response to the generation of said failure signal by said detection circuitry and for switching said switch to the first output thereof in response to the absence of said failure signal output from said detection circuitry.

13. The method of claim 12 wherein said means for interfacing associated with said second port comprises:
   a cellular-type radio/telephone communication system having a cellular-type radio station transceiver located at the premises with the alarm system to provide a wireless communication to a mobile cellular-type switching center, said mobile cellular-type switching center being linked with the public telephone system via telephone lines; and
   means for interfacing said cellular-type radio station transceiver with the telephone output of the alarm system when said switch is controlled to connect the second output thereof to the output thereof.

14. An alarm interface unit for interfacing between an alarm system and the public telephone system, the alarm system interfacing with the public telephone system through a telephone output, comprising:

a telephone port for receiving outgoing calls from the alarm system, which outgoing calls are generated in response to an alarm condition being present;

a switch having an input connected to said telephone port and having first and second outputs;

a first output port including means for interfacing with the public telephone system and for receiving the first output of said switch to allow communication between the alarm system and an alarm monitoring station via the public telephone system in response to access signals from the alarm system;

a second output port for receiving the second output of said switch;

a cellular-type radio/telephone communication system interfaced with said second output port and having a cellular-type radio station transceiver located at the premises with the alarm system to provide a wireless communication to a mobile cellular-type switching center, said mobile cellular-type switching center being linked with the public telephone system via telephone lines; and means for interfacing said cellular-type radio station transceiver with the telephone output of the alarm system when said switch is controlled to connect the second output thereof to the input thereof, said cellular-type radio station transceiver including:

means for automatically generating a unique identification signal in response to detection of said access signals from said alarm system indicating an attempt by the alarm system to establish a communication link with the alarm monitoring station, and sending means for enabling said cellular-type radio station transceiver to transmit said unique identification signal to said mobile cellular-type switching center without transmission of a telephone number, said mobile cellular-type switching center thereafter communicating with the public telephone system via telephone lines;

detection circuitry for detecting a failure of communication between the alarm system through said first output port and the alarm monitoring station via the public telephone system and said detection circuitry generating said failure signal in response to the detection of the failure; and switch control circuitry for switching said switch to said second output in response to the generation of said failure signal by said detection circuitry and for switching said switch to the first output thereof in response to the absence of said failure signal output from said detection circuitry.

15. The alarm interface of claim 14 wherein said detection circuitry includes:

off-hook detect circuitry for determining when the telephone output of the alarm system has gone from an on-hook state to an off-hook state; and means for detecting the timing of intervals between subsequent transitions from an on-hook state to an off-hook state by the telephone output of the alarm system and generating said failure signal when the sequence of transitions from an on-hook state to an off-hook state fit a predetermined pattern.

16. An alarm interface unit for interfacing between the telephone output of an alarm system and the public telephone system, comprising:

a telephone input port for receiving outgoing calls from the telephone output of the alarm system;

a switch having an input and first and second outputs and normally having the input thereof switched to said first output;

first interface means for interfacing with the first output of said switch and the public telephone system;

second interface means for interfacing between the second output of said switch and the public telephone system;

off-hook detect circuitry for detecting when the telephone output of the alarm system goes off-hook;

detect circuitry for detecting the transitions between an on-hook condition and an off-hook condition of said off-hook detect circuitry; and means for comparing the pattern of the occurrences of the transitions between an off-hook condition and an on-hook condition with a predetermined pattern and generating a failure signal when a true comparison is made, said failure signal causing said switch from said first output to switch to said second output.

17. The alarm interface unit of claim 16 wherein said second interface means comprises:

a cellular-type radio/telephone communication system having a cellular-type radio station transceiver located at the premises with the alarm system to provide a wireless communication to a mobile cellular-type switching center, said cellular-type switching center being linked to the public telephone system via telephone lines;

interface circuitry for interfacing between the telephone output of the alarm system and said cellular-type radio station transceiver when the input of said switch is connected to the second output thereof; and sending means for enabling said cellular-type radio station transceiver to effect a communication link through the public telephone system in response to access signals received from the alarm system.

18. The alarm interface unit of claim 17 wherein said cellular-type radio station transceiver includes means for automatically generating a unique identification signal in response to detection of signals from the telephone output of the alarm system indicating an attempt by the alarm system to establish a communication link with the public telephone system;

said sending means being operable to transmit said unique identification signal to said mobile cellular-type switching center without transmission of a telephone number, said mobile cellular-type switching center thereafter communicating with a predetermined telephone number over the public telephone system by telephone lines.

19. An alarm interface unit for interfacing between an alarm system and the public telephone system, the alarm system having a telephone output for interfacing with the public telephone system, the alarm interface comprising:

a telephone port for receiving outgoing calls from the alarm system, which outgoing calls are generated in response to an alarm condition being present;

priority communication means for communicating between the alarm system and an alarm monitoring station via the public telephone system in response to access signals from the alarm system;

secondary communication means for communicating between the alarm system and the alarm monitoring station via the public telephone system in response to access signals from the alarm system and the presence of a failure signal, said priority communication means inhibited during the presence of said failure signal; and detection circuitry for detecting a failure of communication between the alarm system through said priority communication means and the alarm monitoring station via the public telephone system and generation of said failure signal in response to the detection of the failure; and said detection circuitry including:

off-hook detect circuitry for determining when the telephone output of the alarm system has gone from an on-hook state to an off-hook state; and means for detecting the timing of intervals between subsequent transitions from an on-hook state to an off-hook state by the telephone output of the alarm system and generating said failure signal when the sequence of transitions from an on-hook state to an off-hook state fit a predetermined pattern.

* * * * *